Patented July 20, 1937

2,087,455

UNITED STATES PATENT OFFICE 2,087,455

RECOVERING AROMATIC CONSTITUENTS FROM MINERAL OIL

William M. Stratford, New York, N. Y., assignor to The Texas Company, New York, N. Y., a corporation of Delaware No Drawing. Application September 14, 1935, Serial No. 40,627

5 Claims. (Cl. 196—13)

This invention relates to the recovery of desired aromatic constituents of mineral oil. More particularly, the invention relates to the treatment of cracked petroleum naphtha with a solvent containing furfural to extract therefrom aromatic constituents adapted for use as solvents in the preparation of lacquers and varnishes.

The present application is a continuation-in-part of my co-pending application, Serial No. 654,243, filed January 30, 1933, for Recovering aromatic constituents from mineral oil.

Cracked petroleum naphtha resulting from the thermal decomposition of mineral oil comprises olefinic, aromatic, naphthenic and paraffinic hydrocarbons. The olefinic hydrocarbons include unsaturated gum-forming bodies, while the aromatic hydrocarbons comprise fractions of the nature of benzol, toluol, xylol, etc., which are suitable and desirable as solvents for use in the preparation of lacquers and varnishes.

The present invention contemplates the treatment of oil or naphtha containing the foregoing hydrocarbon bodies so as to selectively separate the desired aromatic constituents relatively free from the undesired constituents, such as unsaturated gum-forming bodies, naphthenic and other hydrocarbon constituents.

More specifically, the invention comprises subjecting the cracked naphtha to a preliminary treatment to remove the unsaturated gum-forming constituents, and then extracting the thus treated naphtha with furfural under suitable conditions of temperature and concentration to remove the aromatic constituents without removing substantial amounts of the other hydrocarbon constituents, for example, naphthenic constituents.

Unsaturated constituents, aromatic and naphthenic hydrocarbons are readily soluble in furfural so that when an oil containing these constituents in admixture is subjected to a simple extraction with furfural, the resulting extract will contain each of these constituents while the undissolved portion of the oil will comprise mainly paraffinic constituents. Under ordinary conditions of extraction, furfural exerts about the same degree of solvent power upon olefinic, aromatic and naphthenic hydrocarbons, although of the three, the aromatic constituents are probably the most soluble in the solvent. Accordingly, it is substantially impossible to remove the aromatic constituents alone by subjecting the naphtha to a simple extraction with the solvent.

My invention, therefore, comprises removing the unsaturated gum-forming bodies first, and then treating the remaining oil with furfural under certain conditions of temperature and concentration, such that the desired aromatic fraction is extracted therefrom without removing any substantial amount of naphthenic or other hydrocarbon bodies.

The preliminary treatment may consist in subjecting the cracked naphtha to contact with clay or other solid adsorbent catalytic material, according to now well known methods of contacting while in either vapor or liquid phase with catalytic material of the nature of clay, diatomaceous earth, and the like. The unsaturated bodies, such as diolefines, are thus polymerized, and the contacted naphtha is then subjected to distillation to separate the contacted naphtha from the heavy polymerized compounds.

Instead of the foregoing contact treatment, the unsaturated gum-forming bodies may be removed from the cracked naphtha by subjecting it to extraction with furfural or other selective solvents under suitable conditions of concentration and temperature, so that only the undesired gum-forming bodies are extracted therefrom. The concentration of the solvent and the temperature at which the preliminary extraction treatment is carried out, will depend upon the nature of the cracked naphtha undergoing treatment. The proportion of gum-forming bodies, as well as desired aromatic constituents contained in the cracked naphtha, may vary, depending upon the type of cracking by which the naphtha has been obtained from the cracking stock. In any case, these extracting conditions are adjusted so as not to remove in this preliminary treating step any substantial amount of the aromatic constituents of desired solvent characteristics. Usually, this preliminary extraction treatment involves removing around 5%, or possibly 10%, of the naphtha.

In some cases, this preliminary treatment may be augmented by treatment of the naphtha with chemicals, such as sulphuric acid, followed by neutralization of the alkali for the purpose of removing other impurities of the nature of sulphur compounds and the like. This chemical treatment might either precede or follow the preliminary treatment for the removal of the unsaturated gum-forming or olefinic bodies.

I have found that the desired aromatic fraction can be separated from the preliminarily treated cracked naphtha by extracting it with furfural containing a proper amount of water or other modifying auxiliary liquid, or by extracting it with the solvent or solvent mixture under proper conditions of temperature. By so adjusting the conditions of this final extraction, I am able to separate the desired aromatic constituents without removing any substantial amount of the naphthenic or other hydrocarbon constituents from the naphtha.

As a specific example, I will describe the treatment of a cracked naphtha obtained by subjecting gas oil, derived from Mid-Continent crude, to cracking in a tube-and-drum type of cracking apparatus. The cracked naphtha so obtained contained about 10% unsaturated hydrocarbons, 19% aromatic hydrocarbons, 18% naphthenic hydrocarbons, and the remainder mainly paraffinic type hydrocarbons.

This naphtha was then subjected to a preliminary extraction with furfural containing about 6% of water by volume of the furfural, using about one part of naphtha to one part of solvent. The extraction was carried out at a temperature of around 70° F. so as to remove an extract comprising about 7% or 8% of the cracked naphtha. This extract comprised the unstable gum-forming constituents.

The undissolved portion of the cracked naphtha was then extracted with furfural containing about 3% of water by volume of furfural, using the solvent in the proportion of about one part of solvent to one part of the naphtha. This extraction was made at a temperature of around 70° F. The extraction was carried out under conditions so as to form an extract phase comprising about 22% by volume of the naphtha dissolved in the solvent, and which comprised mainly aromatic constituents of the naphtha. The raffinate phase comprised non-aromatic constituents of the naphtha, such as naphthenic and paraffinic constituents mixed with a small amount of solvent liquid.

While the preliminary extraction described above was effected by treatment with furfural containing a substantially large amount of water, it is, of course, contemplated that it could also have been effected advantageously by contacting the naphtha with a catalytic material, as already referred to.

It is also contemplated that the final extraction may have been made with substantially dry furfural but at relatively lower temperature, such that the furfural exerts preferential solvent action for the aromatic constituents to the substantial exclusion of the naphthenic and other non-aromatic constituents of the oil.

In any case, the extract phase formed in this final extraction, comprising desired aromatic constituents dissolved in the solvent, is then subjected to suitable treatment in order to separate the solvent from the dissolved hydrocarbons, and so recover it for further use. This separation may be effected by adding substantial amounts of water to the extract phase and cooling it, if necessary, in order to displace the dissolved aromatic constituents from the solvent.

Obviously, many modifications and variations of the invention, as hereinbefore set forth, may be made without departing from the spirit and scope thereof, and therefore only such limitations should be imposed as are indicated in the appended claims.

I claim:

1. The method of separating aromatic hydrocarbons adapted for use as solvents in the preparation of lacquer and varnish from cracked naphtha containing unsaturated, aromatic, naphthenic and paraffinic hydrocarbons comprising preliminarily treating the naphtha to remove around 5-10% by volume of the naphtha as a fraction consisting mainly of gum-forming unsaturated hydrocarbons, extracting the so treated naphtha with furfural containing about 3% water by volume, forming an extract phase containing a fraction comprising about 19-22% by volume of the treated naphtha and consisting of mainly aromatic hydrocarbons dissolved in the solvent, and a raffinate phase comprising non-aromatic hydrocarbons, including naphthenic and paraffinic constituents, separating the two phases, and removing the solvent therefrom.

2. The method of separating aromatic hydrocarbons adapted for use as solvents in the preparation of lacquer and varnish from cracked naphtha containing unsaturated, aromatic, naphthenic and paraffinic hydrocarbons comprising preliminarily treating the naphtha to remove around 5-10% by volume of the naphtha as a fraction consisting mainly of gum-forming unsaturated hydrocarbons, extracting the so treated naphtha with about an equal portion of furfural containing 3% of water by volume, forming an extract phase containing a fraction comprising about 19-22% by volume of the treated naphtha and consisting of mainly aromatic hydrocarbons dissolved in the solvent, and a raffinate phase comprising non-aromatic hydrocarbons, including naphthenic and paraffinic constituents, separating the two phases, and removing the solvent therefrom.

3. The method of separating aromatic hydrocarbons adapted for use as solvents in the preparation of lacquer and varnish from cracked naphtha containing unsaturated, aromatic, naphthenic and paraffinic hydrocarbons comprising contacting the naphtha with a solid adsorbent catalytic material to polymerize unsaturated gum-forming constituents, removing the polymerized bodies, extracting the contacted naphtha with furfural containing a small amount of water sufficient to inhibit the solution in the solvent of substantial amounts of non-aromatic hydrocarbons, forming an extract phase comprising aromatic constituents dissolved in the solvent, and a raffinate phase comprising naphthenic and paraffinic hydrocarbons, separating the two phases, and removing the solvent therefrom.

4. The method of separating aromatic hydrocarbons adapted for use as solvents in the preparation of lacquer and varnish from cracked naphtha containing unsaturated, aromatic, naphthenic and other hydrocarbon bodies comprising contacting the naphtha with a solid adsorbent catalytic material to polymerize unsaturated gum-forming constituents, removing the polymerized bodies, extracting the contacted naphtha with furfural containing about 3% of water by volume, forming an extract phase comprising aromatic constituents dissolved in the solvent, and a raffinate phase comprising naphthenic and paraffinic hydrocarbons, separating the two phases, and removing the solvent therefrom.

5. The method of separating aromatic hydrocarbons adapted for use as solvents in the preparation of lacquer and varnish from cracked naphtha containing unsaturated, aromatic, naphthenic and paraffinic hydrocarbon bodies comprising extracting the naphtha with furfural containing about 6% of water by volume to form an extract containing mainly unsaturated gum-forming hydrocarbon constituents, removing the extract phase, then extracting the preliminarily extracted naphtha with furfural containing a relatively smaller amount of water sufficient to inhibit solution in the solvent of substantial amounts of non-aromatic hydrocarbons, forming an extract phase comprising aromatic constituents dissolved in the solvent, and a raffinate phase comprising naphthenic and paraffinic hydrocarbons, separating the two phases, and removing the solvent therefrom.

WILLIAM M. STRATFORD.